US012294821B2

(12) United States Patent
Pal et al.

(10) Patent No.: US 12,294,821 B2
(45) Date of Patent: May 6, 2025

(54) NETWORK SUBSCRIPTION MANAGEMENT SERVICE FOR ENTERPRISE NETWORK COLLABORATION

(71) Applicant: SAP SE, Walldorf (DE)

(72) Inventors: Tanmoy Pal, Arambagh (IN); Jagan Sundaramoorthy, Bangalore (IN)

(73) Assignee: SAP SE, Walldorf (DE)

( * ) Notice: Subject to any disclaimer, the term of this patent is extended or adjusted under 35 U.S.C. 154(b) by 99 days.

(21) Appl. No.: 18/080,839

(22) Filed: Dec. 14, 2022

(65) Prior Publication Data

US 2024/0205571 A1 Jun. 20, 2024

(51) Int. Cl.
*H04L 41/0853* (2022.01)
*H04L 41/5061* (2022.01)
*H04Q 3/00* (2006.01)

(52) U.S. Cl.
CPC ....... *H04Q 3/0062* (2013.01); *H04L 41/0853* (2013.01); *H04L 41/5064* (2013.01)

(58) Field of Classification Search
None
See application file for complete search history.

(56) References Cited

U.S. PATENT DOCUMENTS

| | | | |
|---|---|---|---|
| 7,562,129 B1 * | 7/2009 | Lee | H04L 67/61 709/219 |
| 11,792,088 B1 * | 10/2023 | Nakagaki | H04L 41/0873 709/221 |
| 2011/0125847 A1 * | 5/2011 | Cocheu | G06Q 30/0241 709/204 |
| 2015/0058931 A1 * | 2/2015 | Miu | G06Q 20/02 707/784 |
| 2020/0007655 A1 * | 1/2020 | Namiranian | H04W 76/23 |

* cited by examiner

*Primary Examiner* — Mohamed Ibrahim
(74) *Attorney, Agent, or Firm* — Fish & Richardson P.C.

(57) ABSTRACT

Methods, systems, and computer-readable storage media for network subscription management. An example method includes receiving a request, from a collaboration network, for sub-network subscription offerings that are available for a user of the collaboration network. The user is identified in the collaboration network using a collaboration network identifier and is currently subscribed to a first subscription plan offering of a first sub-network. Compatible sub-network subscription offerings that are available for the user of the collaboration network that are compatible with the first subscription plan offering are determined and provided to the collaboration network. An indication of a selected second subscription plan offering for a second sub-network is received. Subscription service interface information for connecting to the second sub-network is determined and a connection is established to the second sub-network using the subscription service interface information.

14 Claims, 8 Drawing Sheets

NETWORK SUBSCRIPTION MANAGEMENT SERVICE FOR ENTERPRISE NETWORK COLLABORATION

BACKGROUND

Enterprises can execute operations using a multitude of networks. For example, enterprises can be involved in a supply chain and interact with trading partners over respective networks that the enterprises subscribe to. Other example networks can include a procurement network, a logistics sub-network, a workforce management sub-network, and an asset management sub-network.

SUMMARY

Implementations of the present disclosure are directed to a network subscription management service for enterprise network collaboration. In some implementations, actions include: receiving a request, from a collaboration network, for sub-network subscription offerings that are available for a user of the collaboration network, wherein the user is identified in the collaboration network using a collaboration network identifier and is currently subscribed to a first subscription plan offering of a first sub-network; determining, in response to receiving the request, compatible sub-network subscription offerings that are available for the user of the collaboration network that are compatible with the first subscription plan offering of the first sub-network; providing, to the collaboration network, subscription plan offering information for the determined compatible sub-network subscription offerings, in response to the request; receiving, from the collaboration network and for the user, an indication of a selected second subscription plan offering for a second sub-network; determining subscription service interface information for connecting to the second sub-network; and establishing a connection, to the second sub-network, using the subscription service interface information These and other implementations can each optionally include one or more of the following features. A subscription request can be sent to the second sub-network, over the connection, to subscribe the user to the selected second subscription plan offering at the second sub-network. Sub-network account information for the user for a subscription to the selected second subscription plan offering at the second sub-network can be received over the connection. The sub-network account information can be stored for the user in association with the collaboration network identifier. The subscription plan offering information can be categorized using a central subscription model that maps different subscription plan types of different sub-network subscription offerings to a set of standard account types. Standard account types can include development, quality-assurance, production, and testing. The subscription service interface information for the second sub-network can be different from subscription service interface information for the first sub-network. Determining the compatible sub-network subscription offerings can include: determining a first standard account type associated with the first subscription plan offering of the first sub-network; and determining, as the compatible sub-network subscription offerings, subscription offerings that have a same first standard account type. The user can be subscribed to the selected second subscription plan offering without having to undergo a complete second onboarding process. Sub-networks associated with the collaboration network can include a logistics sub-network, a manufacturing sub-network, an asset management sub-network, and a workforce management sub-network.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
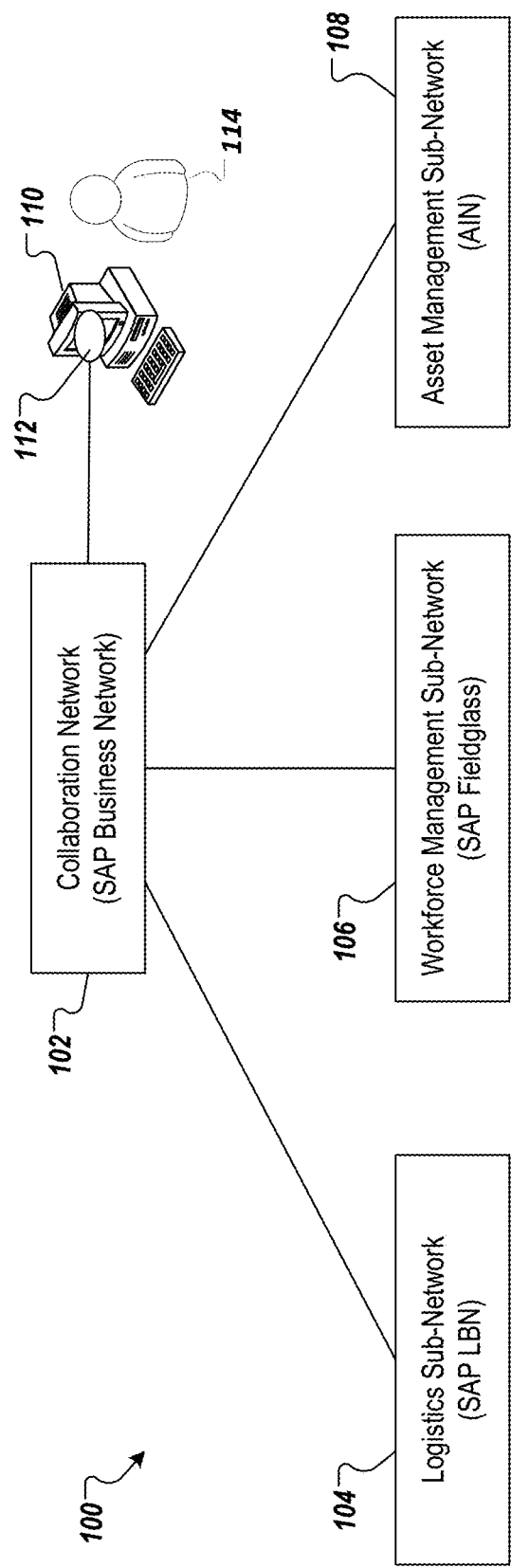
FIG. 1 depicts an example architecture in accordance with implementations of the present disclosure

Implementations of the present disclosure are directed to a network subscription management service for enterprise network collaboration. In some instances, a collaboration network can be provided that enables enterprises to interact with trading partners in various sub-networks through a portal. An example collaboration network includes, without limitation, SAP Business Network provided by SAP SE of Walldorf, Germany. SAP Business Network can be described as a collaboration platform that provides a unified trading partner portal, through which enterprises have a holistic view into all of their relationships and transactions with trading partners in their supply chains. Although SAP Business Network is discussed herein by way of example for purposes of illustration, implementations of the present disclosure can be realized with any appropriate collaboration network.

In general, the collaboration network enables buyers and suppliers to collaborate on transactions, strengthen relationships, and discover opportunities. In some examples, the collaboration network enables enterprises (as buyers) to automate procurement processes from source to settle, while controlling spending, finding new sources of savings, and building a healthy, ethical supply chain. In some examples, the collaboration network enables enterprises (as suppliers) to help their buyers achieve their procurement transformation goals, collaborating in the cloud to boost customer satisfaction, simplify sales cycles, and improve performance.

In some examples, an enterprise establishes an account in the collaboration network and enterprise data can be viewed and summarized using a portal. In some examples, the portal unifies all points of interaction and integration across one or more sub-networks that the enterprise engages its trading partners through. Example sub-networks can include, without limitation, a procurement sub-network, a logistics sub-network, a workforce management sub-network, and an asset management sub-network. An example procurement sub-network includes, without limitation, SAP Ariba Network provided by SAP SE. SAP Ariba Network can be described as a network for suppliers and buyers to collaborate on transactions. An example logistics sub-network includes, without limitation, SAP Logistics Business Network (LBN) provided by SAP SE. SAP LBN can be described as a network that enables enterprises to engage with logistics-related service providers (e.g., freighting, warehousing, receiving). An example workforce management sub-network includes, without limitation, SAP Fieldglass provided by SAP SE. SAP Fieldglass can be described as an external workforce management network that enables enterprises to engage with and manage external workforce assets (e.g., non-employees and/or contract labor engaged for specialized talent, sought-after skills, and/or on-demand capacity). An example asset management sub-network can include, without limitation, SAP Asset Intelligence Network (AIN) provided by SAP SE. SAP AIN enables enterprises to collect, analyze, and share asset (e.g., equipment) usage information. Although SAP Ariba Network, SAP LBN, SAP Fieldglass, and SAP AIN are discussed herein by way of examples for purposes of illustration, implementations of the present disclosure can be realized with any appropriate sub-networks that can be interacted with through a collaboration network.

A given enterprise may wish to onboard to multiple sub-networks that are managed by the collaboration network. However, each sub-network may use different procedures and different data for onboarding a new enterprise to the sub-network. The collaboration network may lack centralized management for onboarding to different sub-networks, for example. Accordingly, onboarding to each, different sub-network may result in a different, separate onboarding process and onboarding experience for the enterprise. An enterprise may, for example, first onboard to a logistics sub-network by undergoing a first onboarding process. If the enterprise later decides to onboard, for example, to an asset management sub-network, the enterprise may need to undergo a second complete separate onboarding process. The second onboarding process and experience may be inconsistent and not seamless with the first onboarding process. As another example, the second, separate onboarding process may involve repetitive steps that were already performed during the first onboarding process. Furthermore, the enterprise may not be aware of which subscription plan offerings are available that are compatible with sub-network(s) to which the enterprise has subscribed.

To provide more efficient and more seamless subnetwork onboarding processes, implementations of the present disclosure provide a central network subscription management service (NSMS) that enables enterprises to be onboarded to one or more sub-networks through a collaboration network. The NSMS is a central onboarding layer that can provide consistent and seamless onboarding to multiple sub-networks. The NSMS can serve as an adapter or gateway for onboarding to different sub-networks through the collaboration network. Once an enterprise has been onboarded to a first sub-network using the NSMS, the enterprise can be onboarded to a second, different sub-network without having to perform a complete re-boarding process. Accordingly, the NSMS can add unified onboarding functionality to the collaboration network to increase the role of the collaboration network being a unified solution for enterprises.

The NSMS can provide consistent and streamlined onboarding of enterprises to different sub-networks in the collaboration network. Enterprises can more easily onboard to different sub-networks at efficient integration points while using the collaboration network. From an enterprise agent perspective, onboarding to additional sub-networks can involve selection of available subscription plan offerings that are compatible with an existing account, rather than an involvement of multiple separate disjoint onboarding processes. Additionally, integrating a new sub-network within the collaboration network can be streamlined with the NSMS as integration efforts can be localized to the NSMS using the existing infrastructure and centralized subscription model of the NSMS.

FIG. 1 depicts an example architecture 100 in accordance with implementations of the present disclosure. In FIG. 1, the example architecture 100 includes a collaboration network 102, a logistics sub-network 104, a workforce management sub-network 106, and an asset management sub-network 108. In the example of FIG. 1, a computing device 110 is represented, which can provide a portal 112 (e.g., one or more user interfaces (UIs)), through which an agent 114 of an enterprise (e.g., an employee) can interact with the collaboration network 102.

In some examples, the computing device 110 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

The collaboration network 102, the logistics sub-network 104, the workforce management sub-network 106, the asset management sub-network 108, and the computing device 110 can communicate over one or more communication networks. In some implementations, the communication networks can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

The agent 114 can use the computing device 110 to access the portal 112 to obtain access to different functionalities of sub-networks of the collaboration network 102, for example. However, as described above, onboarding to the different sub-networks may involve separate, uncoordinated processes. Each of the logistics sub-network 104, the workforce management sub-network 106, and the asset management sub-network 108 may have different onboarding and subscription services, for example. Having to separately onboard to different sub-networks can result in inconsistent and/or repetitive processes. Repeating common portions for each onboarding can result in wasted resources used for re-obtaining similar or same inputs. For example, the agent 114 may have to complete an initial onboarding to a first sub-network, and then have to complete subsequent, other onboardings (which can be referred to as "reboardings") to other sub-networks. In some cases, the agent 114 has to, rather than use the portal 112, separately use different interfaces of different sub-networks to onboard to different sub-networks or subscribe to different subscription offerings of different networks. Using separate UIs, separate processes, obtaining separate licenses with different pricing structures, etc., with each onboarding process done in a separate environment or interface (e.g., as a separate "silo") can be frustrating, inconsistent, and inefficient for enterprises.

Furthermore, the portal 112 might not be currently configured to inform the agent 114 of the availability of all subscription plan offerings that are available to the enterprise after a first onboarding. Additionally, maintenance costs can be incurred for the collaboration network 102 to support new sub-networks, as different portions of code of the collaboration network 102 may need to be modified to support a new sub-network (e.g., to interface with an API of the new sub-network). For example, separate development may need to be performed for the collaboration network for each sub-network regarding aspects such as service registration, service plan mapping, landscape mapping, and establishing relationships between sub-networks.

Figure 2:
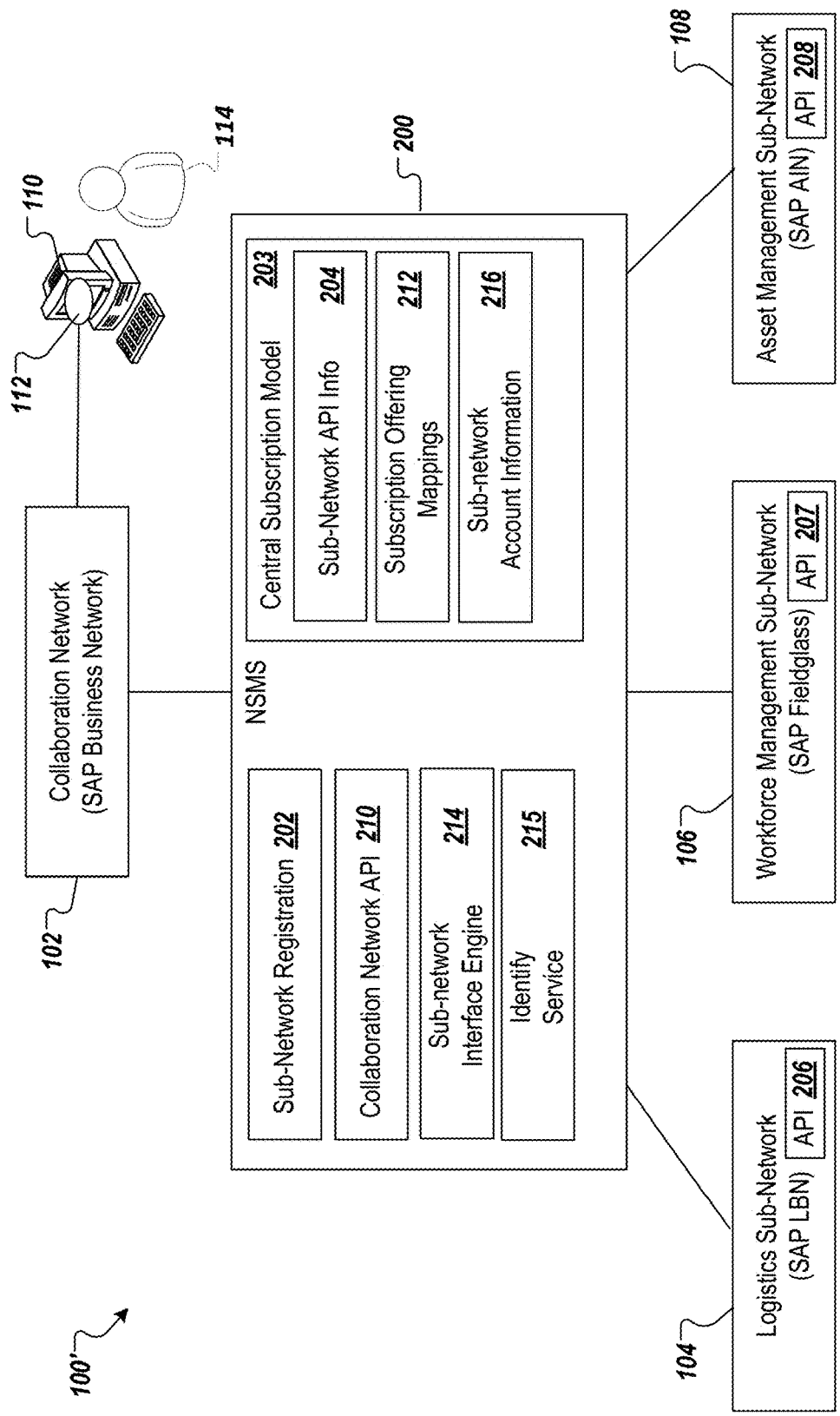
FIG. 2 depicts an example architecture in accordance with implementations of the present disclosure.

FIG. 2 depicts an example architecture 100' in accordance with implementations of the present disclosure. In FIG. 2, the example architecture 100' includes the collaboration network 102, the logistics sub-network 104, the workforce management sub-network 106, and the asset management sub-network 108. In the example of FIG. 2, the computing device 110 is represented, which can provide the portal 112 (e.g., one or more UIs), through which the agent 114 can interact with the collaboration network 102. In the example of FIG. 2, the example architecture 100' includes a NSMS 200 of the present disclosure, which enables the enterprise to efficiently onboard to multiple sub-networks, such as the logistics sub-network 104, the workforce management sub-network 106, and the asset management sub-network 108.

Each sub-network can be registered with the NSMS 200 through interaction with a sub-network registration engine 202. Registration of a sub-network with the NSMS 200 can involve configuring a central subscription model 203 of the NSMS 200 with sub-network API (Application Programming Interface) information 204 that enables the NSMS 200 to invoke different onboarding APIs of different sub-networks, on behalf of an enterprise. For example, the logistics sub-network 104 may provide a first API 206 that accepts a first set of inputs for onboarding an enterprise to the logistics sub-network 104, the workforce management sub-network 106 may provide a second API 207 that accepts a second set of inputs for onboarding an enterprise to the workforce management sub-network 106, and the asset management sub-network 108 may provide a third API 208 that accepts a third set of inputs for onboarding an enterprise to the asset management sub-network 108, where the first API 206, the second API 207, and the third API 208 are each different APIs and the first set of inputs, the second set of inputs, and the third set of inputs are each different sets of inputs.

The NSMS 200 can encapsulate the different APIs and API information for different sub-networks so that enterprises (and the collaboration network 102) are shielded from being aware of onboarding API differences and details. Rather than having to configure and maintain the collaboration network 102 with multiple, different onboarding API and services, the NSMS can provide a single collaboration network API 210 that can be used by the collaboration network 102 to query the NSMS 200 for available subscription offerings and to trigger onboarding to a respective sub-network (e.g., as described in more detail below).

Configuring a sub-network with the NSMS 200 can involve an updating of the central subscription model 203 with subscription offering mappings 212 that map plan offerings provided by the sub-network to a general model. The central subscription model 203 (particularly the subscription offering mappings 212) can provide a unified, generalized model of different subscription offerings across different sub-networks. Different sub-networks may have different offerings or different subscription plan types, for example. When a network is integrated with the NSMS 200, the subscription offering mappings 212 can be updated to map, for example, subscription plan types to a more general standard set of account types. For example, the logistics sub-network 104 may offer production and test subscription plan types, but the workforce management sub-network 106 may offer production, test, and preview subscription plan types. The subscription offering mappings 212 may map respective production and test subscription plan types to corresponding generalized product and test account types for each sub-network but map the preview subscription plan type of the workforce management sub-network 106 to the generalized test account type. The subscription offering mappings 212 can also include other mappings, such as mapping of specific sub-product offerings to respective subscription plan types and generalized account types and specific landscape information to particular subscription offerings. The subscription offering mappings 212 can also store different subscription offering information, such as licensing and pricing information, in a consistent, unified format.

After sub-networks have been registered with the NSMS 200, the agent 114 of the enterprise can access the portal 112 and provide an input that indicates a desire to create an account in the collaboration network 102. The collaboration network 102 can create an account for the enterprise and assign a collaboration network identifier to the enterprise.

The collaboration network 102 can, using the collaboration network API 210, send a request to the NSMS 200 for information about available sub-network subscription offerings available in the collaboration network 102. The NSMS 200 can retrieve subscription offering information from the central subscription model 203 that indicates available subscription offerings for various sub-networks, subscription plan types, generalized account types, and product sub-offerings. The NSMS 200 can provide the subscription offering information to the collaboration network 102 for presentation in the portal 112. The agent 114 of the enterprise can select a particular subscription plan offering for a particular sub-network. For example, the agent 114 can select a particular subscription plan offering for the workforce management sub-network 106.

The collaboration network 102 can, using the collaboration network API 210, notify the NSMS 200 of the selected subscription plan offering of the workforce management sub-network 106. The NSMS 200 can identify (e.g., in the sub-network API information 204) one or more onboarding APIs provided by the workforce management sub-network 106. A sub-network interface engine 214 can, on behalf of the enterprise and the collaboration network 102, invoke the second API 207 provided by the workforce management sub-network 106, to onboard the enterprise to the workforce management sub-network 106. The sub-network interface engine 214 can authenticate the enterprise to different sub-networks. Different sub-networks can use different authentication/authorization procedures using different types of data, for example.

For example, the sub-network interface engine 214 can include or use an identity service 215. Sub-network credentials can be stored in sub-network account information 216 of the NSMS 200, for example. When the NSMS 200 subscribes to a sub-network, a trust relationship can be established between the identity service 215 of the NSMS 200 and an identity service of the sub-network. Accordingly, when the NSMS 200 invokes a particular onboarding API of a sub-network (e.g., the second API 207), the NSMS 200 can provide a token to the sub-network that can be honored/trusted by the sub-network since the token issuer (e.g., the identity service 215) is trusted by the sub-network.

The workforce management sub-network 106 can onboard the enterprise to the workforce management sub-network 106 in response to invocation of the second API 207 and provide sub-network account information (e.g., sub-network identifier, tenant identifier, etc.) to the NSMS 200. The NSMS 200 can store, in the sub-network account information 216, the sub-network account information for the enterprise for the workforce management sub-network 106, mapped to a collaboration network identifier associated with the enterprise. The sub-network account information 216 can store information for various subscription offerings to which different enterprises have subscribed. The sub-network account information 216 can include account type information (e.g., development, production, test) which can be referenced to ensure that integration of different sub-network accounts is compatible (e.g., the NSMS 200 can ensure that production accounts are not integrated with test accounts).

After being onboarded to the workforce management sub-network 106, the portal 112 can enable the agent 114 to access the workforce management sub-network 106. The collaboration network 102 can, using the collaboration network API 210, query the NSMS 200 for subscription offering information of additional available subscriptions that are compatible with the enterprise account of the collaboration network 102. For example, regarding compatibility, the enterprise account for the workforce management sub-network 106 may be of a generalized test account type, and the NSMS 200 can provide subscription information of available subscriptions in the collaboration network 102 that match the generalized test account type. The collaboration network 102 can display the received subscription information of available subscriptions in the portal 112.

The agent 114 can select an available subscription offering in the portal 112. For example, the agent may select an available subscription offering provided by the logistics sub-network 104. The NSMS 200 can identify and invoke the first API 206 of the logistics sub-network 104 to onboard the enterprise to the logistics sub-network 104. The onboarding of the enterprise to the logistics sub-network 104 can be streamlined and involve reduced agent input or selections when data previously received from a first onboarding can be used for the next onboarding.

Figure 3:
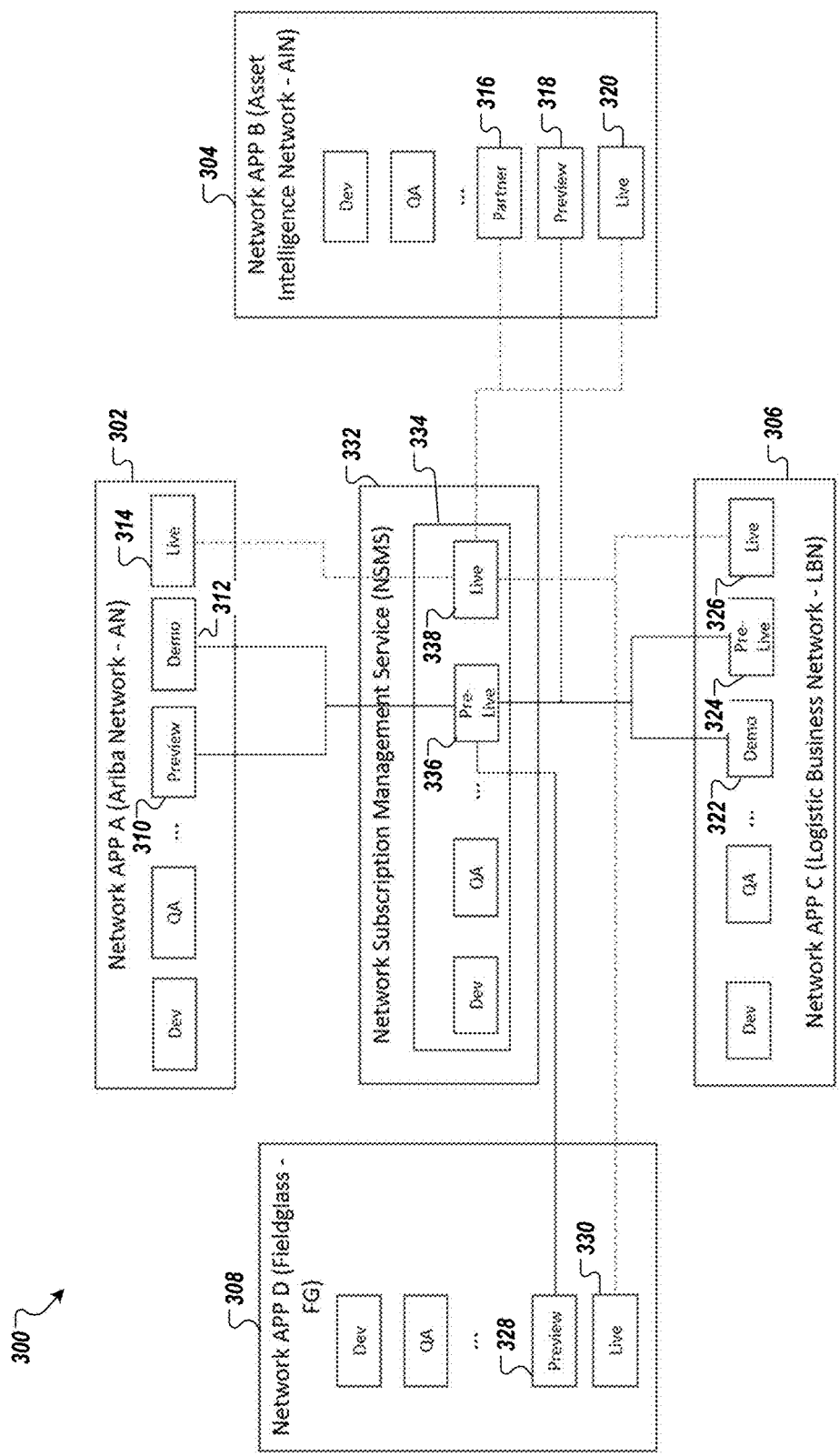
FIG. 3 depicts an example system that illustrates subscription plan type mappings.

FIG. 3 depicts an example system 300 that illustrates subscription plan type mappings. The system 300 includes different sub-networks of a collaboration network. For instance, the system 300 includes a sub-network 302 (e.g., an Ariba Network), a sub-network 304 (e.g., an Asset Intelligence Network), a sub-network 306 (e.g., a Logistics Business Network), and a sub-network 308 (e.g., a Fieldglass network). The various sub-networks may have some common subscription plan types. For instance, each sub-network 302, 304, 306, and 308 offers a "Dev" (development) and a "QA" (Quality Assurance) subscription plan type.

However, differences can generally occur between sub-networks in overall subscription plan offerings. For instance, the sub-network 302 offers preview 310, demo 312, and live 314 subscription plan types, the sub-network 304 offers partner 316, preview 318, and live 320 subscription plan types, the sub-network 306 offers demo 322, pre-live 324, and live 326 subscription plan types, and the sub-network 308 offers preview 328 and live 330 subscription plan types.

A NSMS 332 can be used to manage and merge differences in subscription plan types into a common subscription model 334 that includes generic account types. Each subscription plan type of a respective sub-network can be mapped to a generic account type in the common subscription model 334. For example, the preview 310 and demo 312 subscription plan types of the sub-network 302 can be mapped to a generic pre-live account type 336, and the live 314 subscription plan type of the sub-network 302 can be mapped to a generic live account type 338. The partner 316 and live 320 subscription plan types of the sub-network 304 can be mapped to the generic live account type 338, and the preview 318 subscription plan type of the sub-network 304 can be mapped to the generic pre-live account type 336. The demo 322 and the pre-live 324 subscription plan types of the sub-network 306 can be mapped to the generic pre-live account type 336, and the live 326 subscription plan type of the sub-network 306 can be mapped to the generic live account type 338. The preview 328 and live 330 subscription plan types of the sub-network 308 can be mapped to the generic pre-live account type 336 or the generic live account type 338, respectively.

Figure 4:
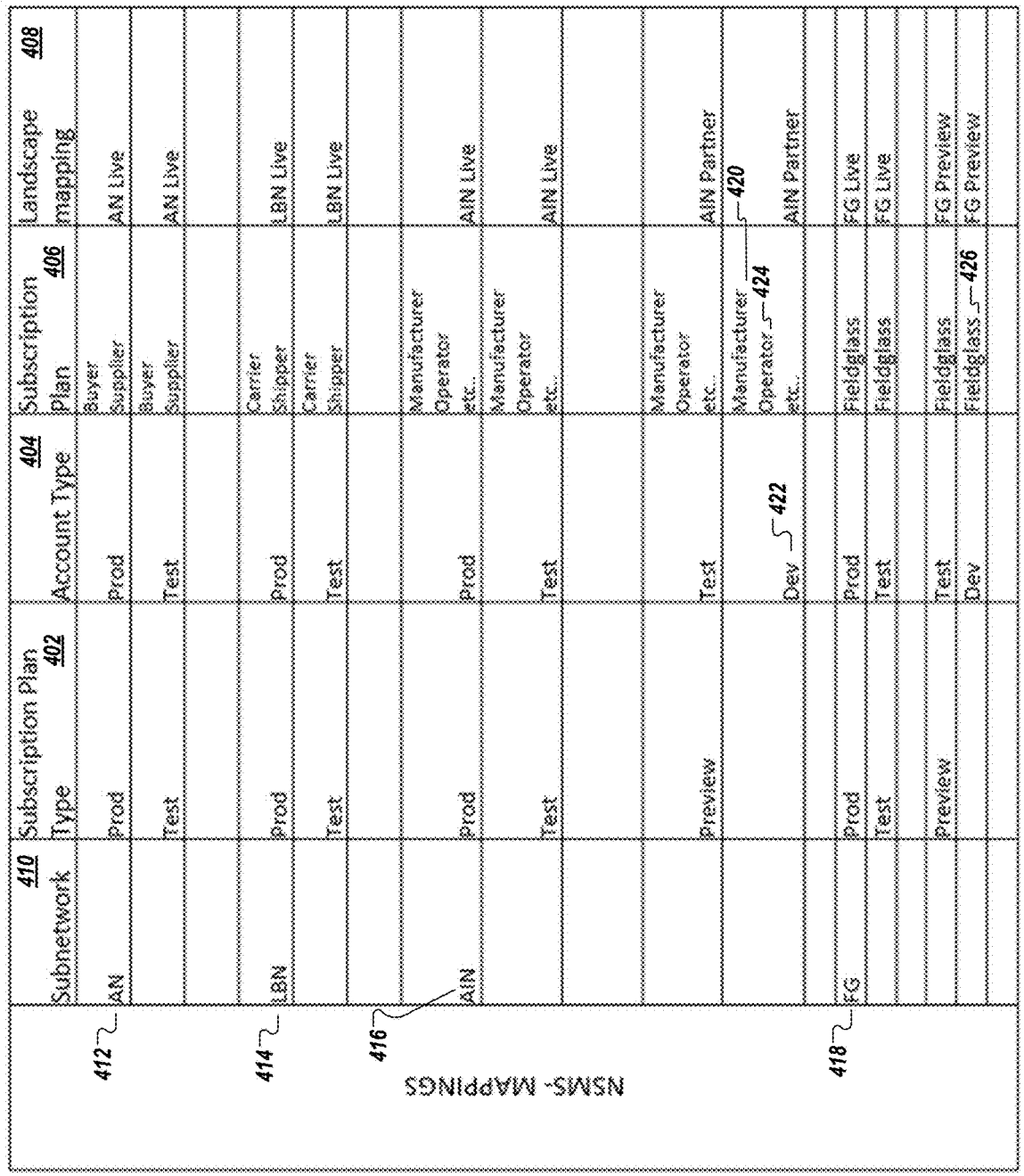
FIG. 4 illustrates example subscription offering mappings.

FIG. 4 illustrates example subscription offering mappings 400. The subscription offering mappings 400 can map a subscription plan type 402 to an account type 404, one or more subscription plans 406, and landscape mapping information 408 for different subnetworks 410. For instance, the subscription offering mappings 400 include mappings for an Ariba Network 412, a Logistics Business Network 414, an Asset Intelligence Network 416, and a Fieldglass network 418. The subscription offerings mappings 400 can include information provided by or for a given sub-network when the sub-network registers with the NSMS, which is then included in a common model.

The subscription offering mappings 400 can be used by the NSMS to communicate which compatible subscription plan offerings are available in the collaboration for a given account at a particular point in time. For example, a user of the collaboration network may be subscribed to a manufacturer subscription plan offering 420 of a "Dev" (e.g., development) account type 422 of the Asset Intelligence Network 416. The NSMS can inform the collaboration network about other subscription plan offerings that are compatible with the user's current subscription. For example, the NSMS can determine that an operator subscription plan offering 424 of the Asset Intelligence Network 416 and a Fieldglass subscription plan offering 426 of the Fieldglass network 418 have Dev account types that match the Dev account type 422. Accordingly, the compatible subscription plan offerings can be recommended to the user.

Figure 5:
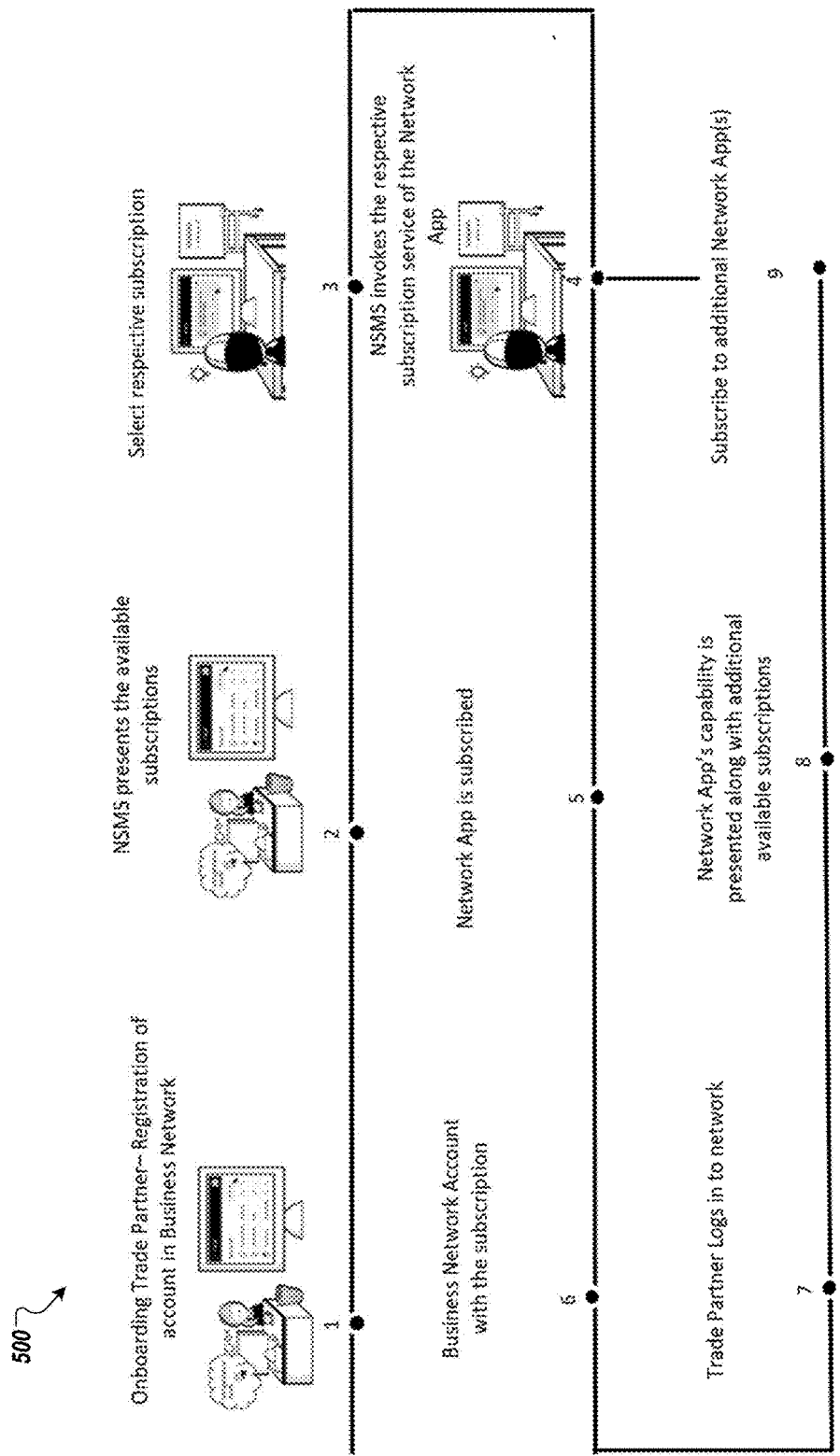
FIG. 5 is a flowchart that depicts an example process that can be executed in accordance with implementations of the present disclosure.

FIG. 5 is a flowchart that depicts an example process 500 that can be executed in accordance with implementations of the present disclosure. Steps of the process 500 are numbered (e.g., one through nine) in FIG. 5. In a first step, onboarding of a trade partner to a collaboration network (e.g., SAP Business Network) is initiated. An account can be created for the trade partner in the collaboration network and a collaboration network identifier can be generated for and assigned to the trade partner.

In a second step, sub-network subscription offerings that are available to the trade partner are presented, such as in a collaboration network portal, based on available subscription offering information that is obtained by the collaboration network from a NSMS. In a third step, the trade partner selects, in the collaboration network portal, a first respective subscription offering from among available subscription offerings.

In a fourth step, the NSMS invokes an API (e.g., a respective subscription service) of a first sub-network (e.g., "network app") that offers the selected subscription offering. In a fifth step, the first sub-network onboards the trade partner to the first respective sub-network in response to invocation of the first sub-network's subscription service. In a sixth step, the trade partner's collaboration network account is linked with a sub-network account of the first sub-network. For example, a collaboration network account identifier or other account information can be linked to a sub-network account identifier or other sub-network account information of the first sub-network.

In a seventh step, such as at a later time after being subscribed to the first sub-network, the trade partner logs into the collaboration network. In an eighth step, the first sub-network's capability is presented, such as in the collaboration network portal. The trade partner can use the collaboration network portal to obtain access to capabilities of the first sub-network, for example. The collaboration network can support SSO (Single Sign On), for instance. After logging into the collaboration network, the trade partner can access functionality (e.g., through a trade partner portal) of sub-network(s) to which the trade partner has subscribed.

Also in the eighth step, additional sub-network subscription offerings are presented to the trade partner, based on available subscription offering information obtained by the collaboration network from the NSMS. In some implementations, the NSMS can provide subscription offering information that is compatible with an account type selected for the first sub-network. For example, if the trade partner had previously selected a subscription offering of a production account type for the first sub-network, the additional sub-network offerings can include offerings also of the production account type offered by sub-networks.

In a ninth step, the trade partner subscribes to one or more additional sub-networks (e.g., network apps), after reviewing the presented information regarding other available subscription offerings from other sub-networks. Subscribing to the additional sub-networks(s) can occur as described above with respect to steps three through five. The collaboration network identifier can thus be linked to multiple sub-network account identifiers after multiple onboardings to different sub-networks has occurred, for example. As described above, subscribing to additional sub-networks can be performed in a seamless, streamlined fashion without requiring the trade partner to perform additional full onboarding procedures for the additional sub-network subscriptions.

Figure 6A:
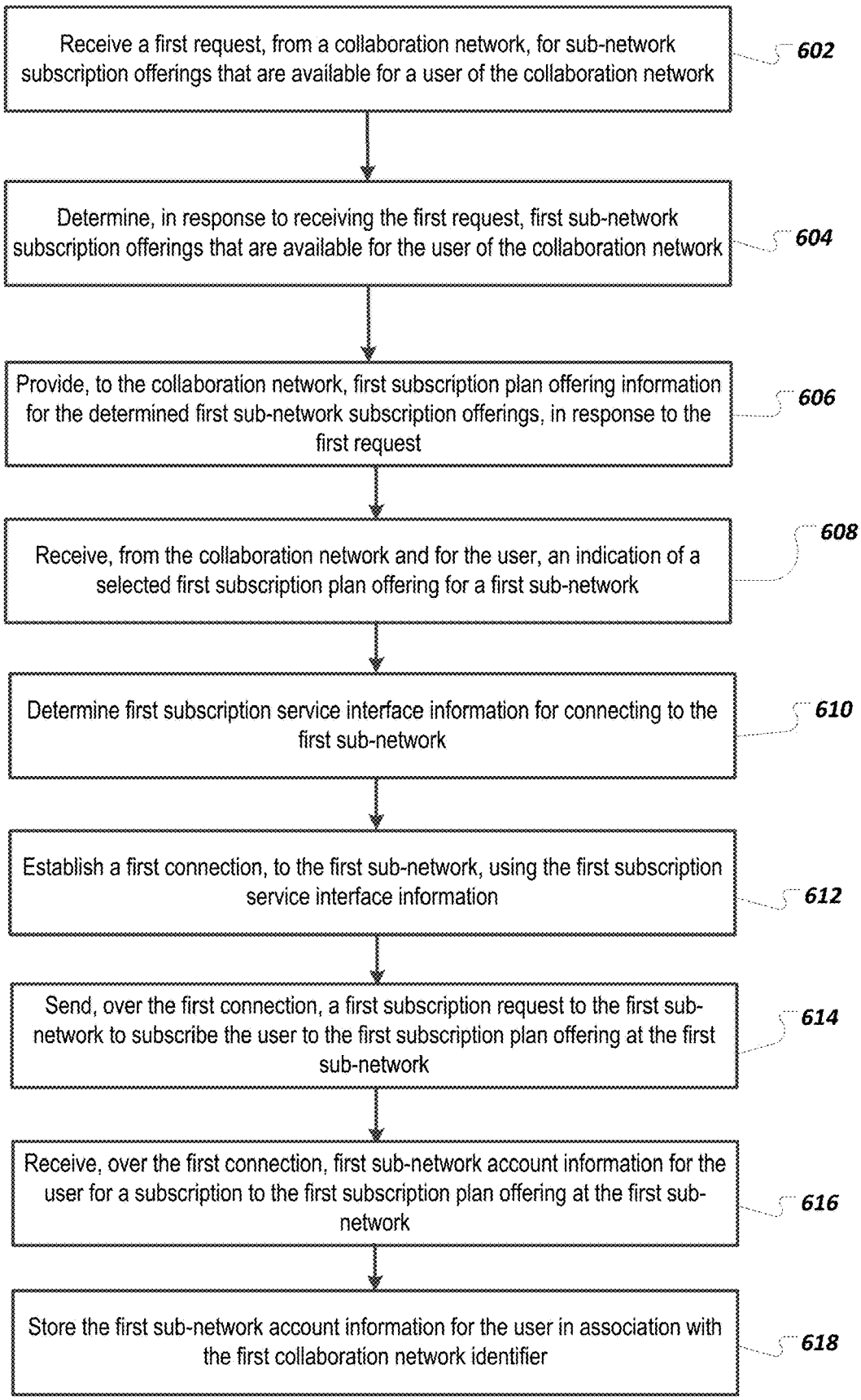
FIG. 6A depicts an example process that can be executed in accordance with implementations of the present disclosure.

FIG. 6A depicts an example process 600 that can be executed in accordance with implementations of the present disclosure. In some examples, the example process 600 is provided using one or more computer-executable programs executed by one or more computing devices.

A first request is received, from a collaboration network, for sub-network subscription offerings that are available for a user of the collaboration network (602). The user is identified in the collaboration network using a first collaboration network identifier. Sub-networks associated with the collaboration network can include a logistics sub-network, a manufacturing sub-network, an asset management sub-network, and a workforce management sub-network, to name a few examples.

In response to receiving the first request, first sub-network subscription offerings are determined that are available for the user of the collaboration network (604).

First subscription plan offering information for the determined first sub-network subscription offerings is provided to the collaboration network, in response to the first request (606). The first subscription plan offering information can be categorized using a central subscription model that maps different subscription plan types of different sub-network subscription offerings to a set of standard account types. Standard account types can include development, quality-assurance, production, and testing.

An indication of a selected first subscription plan offering for a first sub-network is received for the user from the collaboration network (608).

First subscription service interface information is determined for connecting to the first sub-network (610).

A first connection is established to the first sub-network using the first subscription service interface information (612).

A first subscription request is sent to the first sub-network over the first connection to subscribe the user to the first subscription plan offering at the first sub-network (614).

First sub-network account information for the user is received over the first connection for a subscription to the first subscription plan offering at the first sub-network (616).

The first sub-network account information is stored for the user in association with the first collaboration network identifier (618).

After the user is subscribed to the first subscription plan offering, the user can subscribe to other subscription plan offerings (e.g., offered by other sub-networks). For example, after the user has been subscribed to the first subscription plan offering, a second request can be received from the collaboration network for sub-network subscription offerings that are available to the user that are compatible with the subscription to the first subscription plan offering. In response to receiving the second request, second sub-network subscription offerings can be determined that are available to the user that are compatible with (e.g., of a same standard account type as) the first subscription plan offering. Second subscription plan offering information for the determined second sub-network subscription offerings can be provided to the collaboration network, in response to the first request. An indication of a selected second subscription plan offering for the user for a second sub-network can be received from the collaboration network. Second subscription service interface information for connecting to the second sub-network can be determined. The second sub-scription service information can be different from the first subscription service interface information. For example, the second sub-network can provide a different subscription API from the first sub-network. A second connection can be established, to the second sub-network, using the second subscription service information. A second subscription request can be sent to the second sub-network over the second connection to subscribe the user to the second subscription plan offering at the second sub-network. Second sub-network account information for the user for a subscription to the second subscription plan offering at the second sub-network can be received over the second connection. The second sub-network account information for the user can be stored in association with the first collaboration network identifier and the first sub-network account information. The user, therefore, can be subscribed to the second subscription plan offering without having to undergo a complete second onboarding process.

Figure 6B:
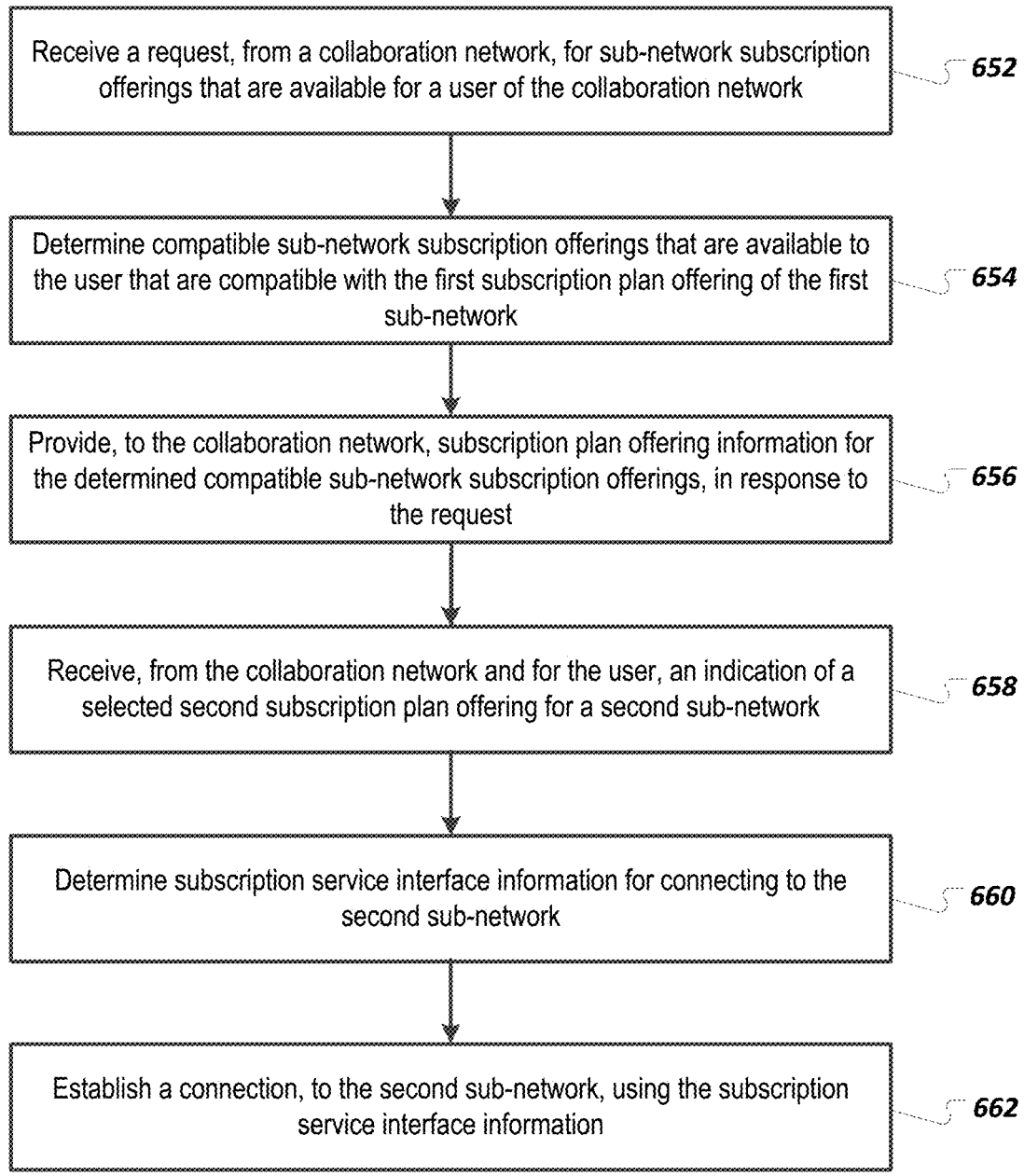
FIG. 6B depicts an example process that can be executed in accordance with implementations of the present disclosure.

FIG. 6B depicts an example process 650 that can be executed in accordance with implementations of the present disclosure. In some examples, the example process 600 is provided using one or more computer-executable programs executed by one or more computing devices.

A request is received, from a collaboration network, for sub-network subscription offerings that are available for a user of the collaboration network (652). The user is identified in the collaboration network using a collaboration network identifier and the user currently subscribed to a first subscription plan offering of a first sub-network. Sub-networks associated with the collaboration network can include, for example, one or more of a procurement network, a logistics sub-network, a manufacturing sub-network, an asset management sub-network, and a workforce management sub-network.

Compatible sub-network subscription offerings are determined, in response to the request, that are available for the user of the collaboration network that are compatible with the first subscription plan offering of the first sub-network (654). Determining the compatible sub-network subscription offerings can include: determining a first standard account type associated with the first subscription plan offering of the first sub-network; and determining, as the compatible sub-network subscription offerings, subscription offerings that have a same first standard account type.

Subscription plan offering information for the determined compatible sub-network subscription offerings is provided to the collaboration network in response to the request (656). The subscription plan offering information can be categorized using a central subscription model that maps different subscription plan types of different sub-network subscription offerings to a set of standard account types. Standard account types can include development, quality-assurance, production, and testing.

An indication of a selected second subscription plan offering for a second sub-network is received for the user, from the collaboration network (658).

Subscription service interface information for connecting to the second sub-network is determined (660). The subscription service interface information for the second sub-network can be different from subscription service interface information for the first sub-network.

A connection is established, to the second sub-network, using the subscription service interface information (662). A subscription request can be sent to the second sub-network, over the connection, to subscribe the user to the selected second subscription plan offering at the second sub-network. Sub-network account information for the user for a subscription to the selected second subscription plan offering at the second sub-network can be received over the connection. The sub-network account information can be stored for the user in association with the collaboration network identifier. The user can be subscribed to the selected second subscription plan offering without having to undergo a complete second onboarding process.

Figure 7:
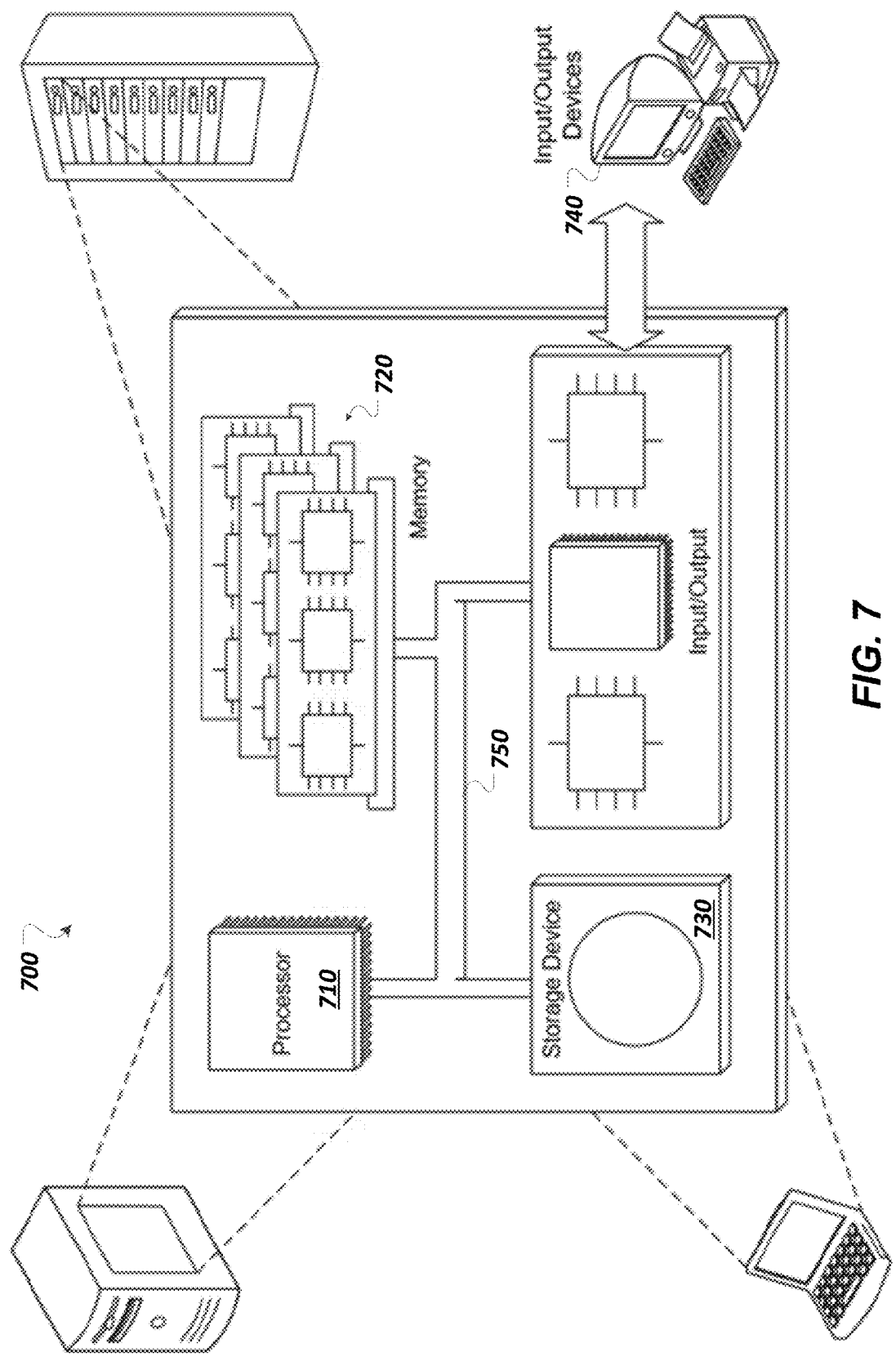
FIG. 7 is a schematic illustration of example computer systems that can be used to execute implementations of the present disclosure.

Referring now to FIG. 7, a schematic diagram of an example computing system 700 is provided. The system 700 can be used for the operations described in association with the implementations described herein. For example, the system 700 may be included in any or all of the server components discussed herein. The system 700 includes a processor 710, a memory 720, a storage device 730, and an input/output device 740. The components 710, 720, 730, 740 are interconnected using a system bus 750. The processor 710 is capable of processing instructions for execution within the system 700. In some implementations, the processor 710 is a single-threaded processor. In some implementations, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. In some implementations, the memory 720 is a volatile memory unit. In some implementations, the memory 720 is a non-volatile memory unit. The storage device 730 is capable of providing mass storage for the system 700. In some implementations, the storage device 730 is a computer-readable medium. In some implementations, the storage device 730 may be a floppy disk device, a hard disk device, an optical disk device, or a tape device. The input/output device 740 provides input/output operations for the system 700. In some implementations, the input/output device 740 includes a keyboard and/or pointing device. In some implementations, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for network subscription management, comprising:
receiving, at a collaboration network, a first registration request to register a first sub-network in the collaboration network, wherein the first registration request includes first subscription plan offering information for the first sub-network and first subscription service application programming interface (API) information comprising a first set of inputs for a first subscription service API for the first sub-network;
receiving, at the collaboration network, a second registration request to register a second sub-network in the collaboration network, wherein the second registration request includes second subscription plan offering information for the second sub-network and second subscription service API information comprising a second set of inputs for a second subscription service API for the second sub-network and wherein the second set of inputs is different from the first set of inputs;
configuring a central subscription model for the collaboration network using the first subscription service API information, the second subscription service API information, the first subscription plan offering information, and the second subscription plan offering information;
receiving a request, at the collaboration network, for sub-network subscription offerings that are available for a user of the collaboration network, wherein the user is identified in the collaboration network using a collaboration network identifier and is currently subscribed to a first subscription plan offering of the first sub-network, wherein the user was subscribed to the first subscription plan offering of the first sub-network by invoking the first subscription service API using a first set of input values for the first set of inputs;
determining, in response to receiving the request and based on the central subscription model, compatible sub-network subscription offerings that are available for the user of the collaboration network that are compatible with the first subscription plan offering of the first sub-network based on having a same account type as the first subscription plan offering;
providing, to the collaboration network, subscription plan offering information for the determined compatible sub-network subscription offerings, in response to the request;
receiving, from the collaboration network and for the user, an indication of a selected second subscription plan offering for a second sub-network;
determining, using the central subscription model, the second subscription service API information for connecting to the second sub-network using the second subscription service API; and
subscribing the user to the second subscription plan offering by invoking the second subscription service API using a second set of input values for the second set of inputs.

2. The computer-implemented method of claim 1, wherein the subscription plan offering information is categorized using the central subscription model that maps different subscription plan types of different sub-network subscription offerings to a set of standard account types.

3. The computer-implemented method of claim 2, wherein standard account types include development, quality-assurance, production, and testing.

4. The computer-implemented method of claim 1, further comprising:
sending, over the connection, a subscription request to the second sub-network to subscribe the user to the selected second subscription plan offering at the second sub-network;
receiving, over the connection, sub-network account information for the user for a subscription to the selected second subscription plan offering at the second sub-network; and storing the sub-network account information for the user in association with the collaboration network identifier.

5. The computer-implemented method of claim 1, wherein the user is subscribed to the selected second subscription plan offering without having to undergo a complete second onboarding process.

6. The computer-implemented method of claim 1, wherein sub-networks associated with the collaboration network include a logistics sub-network, a manufacturing sub-network, an asset management sub-network, and a workforce management sub-network.

7. A non-transitory computer-readable storage medium coupled to one or more processors and having instructions stored thereon which, when executed by the one or more processors, cause the one or more processors to perform operations for network subscription management comprising:
   receiving, at a collaboration network, a first registration request to register a first sub-network in the collaboration network, wherein the first registration request includes first subscription service application programming interface (API) information comprising a first set of inputs for a first subscription service API for the first sub-network;
   receiving, at the collaboration network, a second registration request to register a second sub-network in the collaboration network, wherein the second registration request includes second subscription service API information comprising a second set of inputs for a second subscription service API for the second sub-network and wherein the second set of inputs is different from the first set of inputs;
   configuring a central subscription model for the collaboration network using the first subscription service API information and the second subscription service API information;
   receiving a request, at the collaboration network, for sub-network subscription offerings that are available for a user of the collaboration network, wherein the user is identified in the collaboration network using a collaboration network identifier and is currently subscribed to a first subscription plan offering of the first sub-network, wherein the user was subscribed to the first subscription plan offering of the first sub-network by invoking the first subscription service API using a first set of input values for the first set of inputs;
   determining, in response to receiving the request, compatible sub-network subscription offerings that are available for the user of the collaboration network that are compatible with the first subscription plan offering of the first sub-network based on having a same account type as the first subscription plan offering;
   providing, to the collaboration network, subscription plan offering information for the determined compatible sub-network subscription offerings, in response to the request;
   receiving, from the collaboration network and for the user, an indication of a selected second subscription plan offering for a second sub-network;
   determining, using the central subscription model, second subscription service API information for connecting to the second sub-network using the second subscription service API; and
   subscribing the user to the second subscription plan offering by invoking the second subscription service API using a second set of input values for the second set of inputs.

8. The computer-readable storage medium of claim 7, wherein the subscription plan offering information is categorized using the central subscription model that maps different subscription plan types of different sub-network subscription offerings to a set of standard account types.

9. The computer-readable storage medium of claim 8, wherein standard account types include development, quality-assurance, production, and testing.

10. The computer-readable storage medium of claim 7, wherein the operations further comprise:
    sending, over the connection, a subscription request to the second sub-network to subscribe the user to the selected second subscription plan offering at the second sub-network;
    receiving, over the connection, sub-network account information for the user for a subscription to the selected second subscription plan offering at the second sub-network; and
    storing the sub-network account information for the user in association with the collaboration network identifier.

11. A system, comprising:
    a computing device; and
    a computer-readable storage device coupled to the computing device and having instructions stored thereon which, when executed by the computing device, cause the computing device to perform operations for network subscription management, the operations comprising:
       receiving, at a collaboration network, a first registration request to register a first sub-network in the collaboration network, wherein the first registration request includes first subscription service application programming interface (API) information comprising a first set of inputs for a first subscription service API for the first sub-network;
       receiving, at the collaboration network, a second registration request to register a second sub-network in the collaboration network, wherein the second registration request includes second subscription service API information comprising a second set of inputs for a second subscription service API for the second sub-network and wherein the second set of inputs is different from the first set of inputs;
       configuring a central subscription model for the collaboration network using the first subscription service API information and the second subscription service API information;
       receiving a request, at the collaboration network, for sub-network subscription offerings that are available for a user of the collaboration network, wherein the user is identified in the collaboration network using a collaboration network identifier and is currently subscribed to a first subscription plan offering of the first sub-network, wherein the user was subscribed to the first subscription plan offering of the first sub-network by invoking the first subscription service API using a first set of input values for the first set of inputs;
       determining, in response to receiving the request, compatible sub-network subscription offerings that are available for the user of the collaboration network that are compatible with the first subscription plan offering of the first sub-network based on having a same account type as the first subscription plan offering;

providing, to the collaboration network, subscription plan offering information for the determined compatible sub-network subscription offerings, in response to the request;

receiving, from the collaboration network and for the user, an indication of a selected second subscription plan offering for a second sub-network;

determining, using the central subscription model, second subscription service API information for connecting to the second sub-network using the second subscription service API; and subscribing the user to the second subscription plan offering by invoking the second subscription service API using a second set of input values for the second set of inputs.

12. The system of claim 11, wherein the subscription plan offering information is categorized using the central subscription model that maps different subscription plan types of different sub-network subscription offerings to a set of standard account types.

13. The system of claim 12, wherein standard account types include development, quality-assurance, production, and testing.

14. The system of claim 11, wherein the operations further comprise:

sending, over the connection, a subscription request to the second sub-network to subscribe the user to the selected second subscription plan offering at the second sub-network;

receiving, over the connection, sub-network account information for the user for a subscription to the selected second subscription plan offering at the second sub-network; and storing the sub-network account information for the user in association with the collaboration network identifier.

* * * * *